Patented Mar. 4, 1952

2,588,197

UNITED STATES PATENT OFFICE 2,588,197

PREPARATION OF SHAMPOOS

Herbert I. Bernstein and Charles F. Fuchs, Chicago, Ill., assignors to The Emulsol Corporation, Chicago, Ill., a corporation of Illinois No Drawing. Application January 16, 1946,
Serial No. 641,660

17 Claims. (Cl. 252—110)

1

This invention relates to shampoos and materials for use in shampoos and is particularly concerned with improvements therein, especially in regard to the preparation of shampoos in the form of creams or pastes which, for convenience, are hereafter referred to in the claims as creams.

It has heretofore been suggested to prepare shampoos from sulfates of coconut oil fatty acid amides of monoethanolamine. The deficiencies of such shampoos are mentioned in U. S. Patent No. 2 353,081 and in order to overcome such deficiencies, said patent proposes the utilization, as the foaming or cleansing agents, of sulfates of amides of monoethanolamine with a specific mixture of fatty acids, namely, a mixture of caproic. caprylic and capric acids of which mixture the caprylic acid comprises about 50%. While such agents have certain advantages over the sulfates of coconut oil fatty acid amides of monoethanolamine, they still leave much to be desired both from the standpoint of the properties thereof as well as from the cost angle, it being understood that such special fatty acid fractions are relatively more costly than the readily commercially available fatty acids such as coconut oil fatty acids or lauric acid or mixtures of fatty acids containing predominately lauric acid.

Sulfates of amides of monoethanolamine with lauric acid, myristic acid, coconut oil fatty acids and the like, in the form of sodium salts, apart from their other deficiencies, are insufficiently soluble in water to prepare liquid shampoos having a desired concentration of such agents and, therefore, they have been utilized in the form of monoethanolamine salts. as disclosed in U. S. Patent No. 2.237 629. The monoethanolamine salts of sulfates of amides of monoethanolamine with lauric acid, myristic acid, and the like are not adaptable to the formation of cream or paste-type shampoos. The sodium salts of the sulfates of amides of monoethanolamine with lauric acid, myristic acid, and the like are also unsuitable for the preparation of cream or paste-type shampoos. Apart from the inadequate solubility of the sodium salts as a result of which foam formation is delayed, creams or pastes made therefrom are too stiff and cannot satisfactorily be distributed on the hair in the washing or shampooing operation.

It has been found, in accordance with the present invention, that salts of sulfates of higher fatty acid amides of certain types of hydroxy-alkyl primary amines, when prepared as hereafter described, are superior to materials of the

2 type discussed above for shampoo purposes and adapt themselves to the preparation of creams or pastes of excellent consistency. Of especial utility are the sodium salts of the sulfates of the amides of isopropanolamine with lauric or myristic acids or coconut oil fatty acids or fractions thereof containing predominately lauric acid, such compounds being represented by the formula

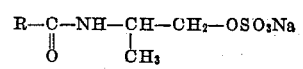

or by the formula

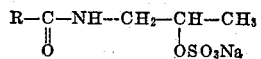

where

is the lauric or like fatty acid acyl radical. While such compounds have heretofore been disclosed, as see, for example, U. S. Patent No. 2,216,617. their manner of preparation has not been such as to produce products which are fully satisfactory for the exacting requirements of quality shampoos.

The sodium salts of the sulfates of the higher fatty acid amides of the particular types of hydroxy-alkyl primary amines, when prepared pursuant to the present invention, are characterized by substantially greater water solubility than the corresponding sodium salts of sulfated amides of monoethanolamine with lauric acid or the like, and, in addition, they may be converted into creams or pastes which have excellent foaming and cleansing properties and excellent creamy texture.

It has also been found that sulfated products prepared from mixtures of amides of isopropanolamine and monoethanolamine, especially when produced in the manner described hereafter, possess better properties with respect to consistency, solubility in water, and stability of foam, than do the sulfated products prepared from the said individual amides. Of such amides, prior to sulfation, the amides of monoethanolamine should be present in a proportion not appreciably greater than that of the amides of isopropanolamine and, preferably, the ratio should be from about 1:1 to about 1:3 of the amides of monoethanolamine to the amides of isopropanolamine.

If higher fatty acid amides of hydroxy-alkyl primary amines, such as monoethanolamine, are sulfated in the manner described hereafter, as exemplified by Examples 1 (b) and 4, the sulfated amides of monoethanolamine cannot be salted out to form a liquid upper layer but, rather, said sulfated amides separate out in pasty, crystalline lumps which form a substantially inseparable mush in the reaction mixture. Separation may be effected by the addition of a considerable quantity of a lower molecular weight alcohol such as isopropanol but such procedure is undesirable. In the first place, expense is involved not only from the standpoint of the cost of the alcohol but also from the standpoint of the removal thereof. If the alcohol is sought to be removed by distillation prior to neutralization of the reaction mixture, difficulties are encountered due to the instability of the sulfated compounds in the acid stage at the elevated temperatures required to be employed. If the reaction mixture is first neutralized with caustic soda or the like, the removal of the alcohol by distillation is also difficult due to the tendency of the reaction mixture to foam. In the second place, the sulfated amides of which result from such procedures have inferior properties.

In accordance with the present invention, superior products are produced while, at the same time, the use of alcohols or the like to effect the separation of the sulfated amides is eliminated together with the attendant disadvantages thereof. It has been found that the sulfated higher fatty acid amides can be much more completely salted out from the reaction mixtures containing the same by means of alkali halides, particularly sodium chloride, than by the use of alkali sulfates as heretofore practiced. The use of the alkali halides, particularly sodium chloride, also brings about a more complete extraction of excess sulfuric acid from the acidic reaction mixture, an upper layer of the desired sulfated amides forms rapidly without the use of alcohols or like organic liquids, and the inorganic salts remaining in the neutralized reaction product do not crystallize out from the concentrate even after prolonged standing as occurs when sodium sulfate is employed as the salting out agent. After the sulfation reaction, which is carried out with an excess of sulfating agent, and before the salting out step, the temperature of the sulfated reaction mixture is prevented from rising materially, preferably by the addition of ice, in amounts sufficient to compensate for the heat of dilution generated by the acidic material. The amount of ice added is also preferably such as to avoid undue dilution of the reaction mixture, a satisfactory amount being, by weight, in general, approximately the same as the weight of the excess sulfuric acid or sulfating agent used in the sulfation reaction. If the temperature rises too high during the salting out reaction, the yield of desired sulfated product is diminished. The presence, in the products of the present invention, of sodium chloride or other alkali chloride, in amounts of the order of about 6% to 10%, preferably about 7% to 8%, serves the desirable function of enhancing the formation of paste or cream products having desirable texture and consistency.

The following Examples 1, 2, 3 and 4 are illustrative of procedures utilized for the production of products which are employed in accordance with the present invention.

Example 1

(a) 500 g. of lauric acid were mixed with 209 g. of isopropanolamine and the mixture was heated gradually to 135 degrees C., under stirring and in an inert gas atmosphere, and the temperature was then raised to 145-175 degrees C. for several hours until the free fatty acid content was below 2%. The reaction mixture was then cooled to about 100 degrees C. and poured into a container in which it solidified. The reaction product, namely, lauric acid amide of isopropanolamine, was an almost colorless, crystalline, wax-like solid, melting at 65-70 degrees C. The product was easily disintegrated by grinding, spray cooling, or by flaking.

(b) 300 g. of ground lauric acid amide of isopropanolamine, produced as described in part (a), were added in portions to 226 g. of 98% sulfuric acid and the mixture was stirred in a cooled flask, protected from humidity, the reaction temperature being kept below 40 degrees C. After the mixing was completed, 90 g. of chlorsulfonic acid were added at such a rate that the HCl which formed escaped without causing too much foam. The stirred and cooled reaction mixture was maintained between 10 degrees C. and 40 degrees C. After all of the chlorsulfonic acid was added and the generation of HCl had stopped, the stirring was interrupted and 200 g. of crushed ice were added and mixed with the reaction product. Thereupon, 800 cc. of an aqueous sodium chloride solution, having a specific gravity of 1.2, were mixed with the reaction mixture and the resulting mass was allowed to settle for 20 to 60 minutes. Two liquid layers formed. The upper contained practically all of the sulfated lauric acid amide of isopropanolamine and the lower the larger part of the excess acid. The lower layer was separated and discarded. The upper layer was mixed with 120 g. of ice and was then neutralized with an aqueous solution of sodium hydroxide (specific gravity 1.32-1.35) until the mixture showed a pH of 7 to 8.5. The product was a viscous, faint yellowish liquid having a total solids content of about 40%, and contained the sodium salt of the sulfated lauric acid amide of isopropanolamine in proportions of about 29% and inorganic salts, namely, sodium chloride and sodium sulfate in a total amount of about 11%. The product had excellent foaming and detergent properties and very good water solubility. Its water solubility, even in the presence of other salts, such as sodium sulfate and sodium chloride, is at least 25 to 35%.

Example 2

(a) 500 g. of coconut oil mixed fatty acids (average molecular weight of 216) were mixed with 192 g. of isopropanolamine. The mixture was heated gradually to 250 degrees F., under stirring and in an inert gas atmosphere, a slow stream of carbon dioxide or nitrogen being bubbled through the reaction mixture. The mixture was heated for 3 hours at 310-325 degrees F., and for an additional ¾ hour at 325-335 degrees F. The reaction product was cooled to about 200 degrees F. and then allowed to solidify in an open pan. It was a soft solid with a melting range of about 100-110 degrees F., and consisted essentially of coconut oil mixed fatty acid amides of ispropanolamine.

(b) 300 g. of coconut oil mixed fatty acid amides of isopropanolamine, of isopropanolamine, produced as described in part (a) were kneaded in a sulfating apparatus made of aluminum and provided with a water cooled jacket. 150 g. of chlorsulfonic acid were added at such a rate that the temperature of the reaction mixture did not exceed 60 degrees C. The hydrogen chloride which was generated was allowed to escape. The acidic reaction product was a rather stiff paste. It was neutralized by adding 120 g. of powdered, anhydrous sodium carbonate. After all of the carbonate had been added, the product was mixed with 500 g. of ice and cold water. It formed an almost colorless paste which settled, on standing, to form a viscous amber liquid. It contained about 35% of the sulfate of the coconut oil mixed fatty acid amides of isopropanolamine.

(c) Instead of neutralizing with powdered, anhydrous sodium carbonate, as described in part (b) hereof, the acidic reaction product may be neutralized with an aqueous sodium hydroxide solution. In this case, crushed ice is added and the mixture is then neutralized with a NaOH solution, preferably of a specific gravity of 1.33–1.35.

Example 3

70 g. of the lauric acid amide of isopropanolamine, produced as described in part (a) of Example 1, were dissolved in 150 g. of methylene dichloride. 35 g. of chlorsulfonic acid were slowly added to the stirred and moderately cooled liquid. The evolved hydrogen chloride was allowed to escape through a drying tube. The acidic reaction product was neutralized by adding an aqueous soium hydroxide solution (specific gravity 1.33–1.35) with continued stirring and cooling. The solvent was then distilled off and most of it recovered by condensation. The last traces were removed by aerating the mixture. The final product consisted of a paste containing about 70% of the sulfate of the lauric acid amide of isopropanolamine. Water was added to obtain a more diluted product.

Example 4

A mixture of 40 pounds of ground lauric acid amide of monoethanolamine and 80 pounds of ground lauric acid amide of isopropanolamine were added gradually to 78 pounds of 96% sulfuric acid, with stirring and cooling, the addition of said amides being at such a rate that the temperature of the mixture did not exceed 120 degrees F., and preferably did not exceed 90 degrees F. After 10 minutes of mixing, 48 pounds of chlorsulfonic acid were added in a slow stream with continued stirring. The hydrogen chloride generated was removed by slight suction. After all of the chlorsulfonic acid was added (60–90 minutes), the mixture was stirred for a short period under reduced pressure to remove most of the excess hydrogen chloride. The stirring was then interrupted and 72 pounds of crushed ice were added and stirred with the acidic product. 360 pounds of a sodium chloride solution (specific gravity 1.2) were added and stirred for 1 to 3 minutes. The mixture was then allowed to settle for 20 to 60 minutes when two layers formed. The lower layer was drawn off and discarded. To the upper layer, 72 pounds of ice were added and the acidic product neutralized with sodium hydroxide solution (specific gravity 1.33–1.35) with stirring until the product showed a pH of 7 to 8.5. The reaction product was an almost colorless paste, and contained about 24% of the sulfates of a mixture of lauric acid amides of monoethanolamine and isopropanolamine and about 7% of sodium chloride.

While the cream or paste products produced as described, by way of illustration, in Examples 2 (b), 3 and 4, may be used as such as shampoos with excellent results, it is frequently advantageous to convert such pastes into aqueous solutions, by dilution with water, and then to reconvert said solutions into creams or pastes. This reconversion to a cream or paste may effectively be accomplished by means of normally solid soaps, which may be formed in situ in the solution; normally solid higher molecular weight alcohols such as cetyl alcohol and stearyl alcohol; normally solid higher molecular weight carboxylic, particularly fatty, acid partial esters of aliphatic polyhydric alcohols, such as monopalmitin, dipalmitin, monostearin, distearin, mixtures of such monoglycerides and diglycerides, stearic acid mono-esters of ethylene glycol, diethylene glycol and higher polyalkylene glycols, stearic acid mono-ester of triethanolamine, and the like. Such agents for the formation of the creams or pastes are preferably untilized in the presence of salts such as alkali metal chlorides and phosphates, particularly sodium chloride and disodium phosphate or mixtures thereof. Indeed, it has been found that the addition of such salts alone serves to convert the aqueous solutions into creams or pastes.

The following Examples A, B, C and D are illustrative of procedures for the production of shampoo preparations, in the form of creams or pastes, from the sulfates of the higher fatty acid amides of isopropanolamine and the like produced, for example, as shown in Examples 1, 2, 3 and 4.

Example A

A mixture of 75 g. of the paste material, produced as described in Example 4, diluted with water to form a solution, 19 g. of a 20% sodium chloride solution and 1.25 cc. of a 40% sodium hydroxide solution were heated to 60 degrees C. and 5 g. of molten stearic acid were added to the stirred mixture. The mixture was stirred and cooled to 30 degrees C. and then allowed to set to a paste.

Example B

A mixture of 85 g. of the paste material, produced as described in Example 4, diluted with water to form a solution, 5 g. of sodium chloride and 5 g. of hydrated disodium hydrogen phosphate were heated to 60 degrees C. and 5 g. of molten cetyl alcohol were added to the stirred mixture. The mixture was stirred and cooled to 30 degrees C. and then allowed to set to a paste.

Example C 75 g. of the solution, produced in part (b) of Example 2, 16.5 g. of water and 1.63 cc. of a 40% sodium hydroxide solution were heated to 60 degrees C. and 6.5 g. of molten stearic acid were added to the well stirred mixture. The mixture was stirred and cooled to 30 degrees C. and then allowed to set to a paste.

Example D

A mixture of 80 g. of a 25% aqueous solution of the sulfate of lauric acid amide of isopropanolamine, produced as described in Example 3, 5 g. of anhydrous sodium sulfate and 15 g. of sodium chloride were heated to 60 degrees C. until the salts had dissolved. The material upon cooling set to a paste.

The hydroxy-alkyl primary amines, the sulfates of whose amides with higher molecular weight fatty acids are utilized pursuant to the present invention, are of that type in which there is at least one lower alkyl radical, such as methyl, ethyl, propyl or butyl, directly attached to the carbon atom to which the amine or hydroxyl radical is attached. Illustrative examples of such hydroxy-alkyl primary amines, other than isopropanolamine, are 2-methyl-2-aminopropanol, 2-ethyl-2-aminopropanol, 2-aminobutanol, 2-aminopentanol, 3-aminopentanol, and the like. These are particularly useful in conjunction or in admixture with monoethanolamine, as previously described. Especially advantageous are the mixtures of the products resulting from the use of isopropanolamine and monoethanolamine, as described more particularly in Example 4.

The higher molecular weight fatty acids whose amides of the hydroxy-alkyl primary amines are sulfated pursuant to the present invention should contain from 8 to 18 carbon atoms. Illustrative examples of such fatty acids are caprylic acid, capric acid, lauric acid, myristic acid, palmitic acid, stearic acid, and oleic acid, as well as mixtures thereof. Of especial utility are lauric acid, coconut oil mixed fatty acids, and particular fractions which have a high content of lauric acid. The intermediate amides, prior to sulfation, may be produced from such acids or their functional derivatives such as the acyl halides and esters.

It will be understood that the sulfated reaction mixtures may be neutralized with various alkaline materials as, for example, potassium hydroxide, lithium hydroxide, magnesium oxide; organic bases such as pyridine, alkyl pyridines, alkylolamines such as monoethanolamine, diethanolamine, triethanolamine, n-propanolamine, isopropanolamine, and the like. Caustic soda is particularly preferred.

While the invention has been described in detail, it is not to be construed as being limited except as expressly set out in the claims.

What we claim as new and desire to protect by Letters Patent of the United States is:

1. An improved cream shampoo comprising a mixture of (1) a water-soluble salt of a higher molecular weight fatty acid amide of sulfated monoethanolamine, and (2) a water-soluble salt of a higher molecular weight fatty acid amide of a sulfated hydroxy-alkyl primary amine in which there is at least one lower alkyl radical directly attached to the carbon atom to which the alcoholic hydroxyl is attached, the higher molecular weight fatty acid radicals of said amides containing from 8 to 18 carbon atoms, (2) being present in proportions of about one to one of (1) to about three to one of (1).

2. An improved cream shampoo comprising an intimate mixture of a water-soluble salt of the lauric acid amide of sulfated isopropanolamine and a water-soluble salt of the lauric acid amide of sulfated monoethanolamine, the salt of the lauric acid amide of sulfated isopropanolamine being present in a proportion at least equal and up to about three times that of the salt of the lauric acid amide of monoethanolamine.

3. An improved cream shampoo comprising a mixture of (1) sodium salts of fatty acid amides of sulfated monoethanolamine and (2) sodium salts of fatty acid amides of sulfated hydroxy-alkyl primary amines in which there is at least one lower alkyl radical directly attached at the carbon atom to which the alcoholic hydroxyl is attached, the fatty acid radicals of said amides containing predominately from 12 to 14 carbon atoms, (2) being present in proportions of about one to one of (1) to three to one of (1).

4. An improved cream shampoo comprising an intimate mixture of the sodium salt of the lauric acid amide of sulfated isopropanolamine and the sodium salt of the lauric acid amide of sulfated monoethanolamine, the sodium salt of the lauric acid amide of sulfated isopropanolamine being present in a proportion at least equal and up to about three times that of the sodium salt of the lauric acid amide of sulfated monoethanolamine.

5. An improved cream shampoo comprising a mixture of the sodium salt of the lauric acid amide of sulfated isopropanolamine and the sodium salt of the lauric acid amide of sulfated monoethanolamine, the sodium salt of the lauric acid amide of sulfated monoethanolamine being present in proportions, in relation to the sodium salt of the lauric acid amide of sulfated isopropanolamine, of from about one to one to about one to three, and from about 6% to about 10% of sodium chloride.

6. An improved cream shampoo comprising sodium salts of higher molecular weight fatty acid amides of sulfated hydroxy-alkyl primary amines in which there is at least one lower alkyl radical directly attached to the carbon atom to which the amide nitrogen is attached and in which the higher molecular weight fatty acid radicals contain from 8 to 18 carbon atoms, and from about 6% to about 10% of a member selected from the group consisting of alkali metal chlorides and disodium hydrogen phosphate.

7. An improved cream shampoo comprising a mixture of the sodium salt of the lauric acid amide of sulfated isopropanolamine and the sodium salt of the lauric acid amide of sulfated monoethanolamine, the sodium salt of the lauric acid amide of sulfated monoethanolamine being present in proportions, in relation to the sodium salt of the lauric acid amide of sulfated isopropanolamine, of from about one to one to about one to three, and a sufficient amount, at least about 5 percent, of a member selected from the group consisting of normally solid soaps, higher molecular weight alcohols, and higher molecular weight fatty acid partial esters of aliphatic polyhydric alcohols, to produce a cream.

8. An improved cream shampoo comprising a sodium salt of the lauric acid amide of sulfated isopropanolamine, and from about 6% to about 10% of at least one member selected from the group consisting of alkali metal chlorides and disodium hydrogen phosphate.

9. In a method of preparing creams, having especial utility for shampoos, the steps which comprise admixing, with an aqueous solution of a water-soluble salt of a sulfate of a higher molecular weight fatty acid amide of a hydroxyalkyl primary amine in which there is, at least one lower alkyl radical directly attached to the carbon atom to which the amine or hydroxyl radical is attached, the higher molecular weight fatty acid radical of said amide containing from 8 to 18 carbon atoms, from about 6% to about 10% of a member selected from the group consisting of alkali metal chlrides and disodium hydrogen phosphate, and a sufficient amount, at least 5%, of a member selected from the group consisting of normally solid soaps, higher molecular weight alcohols, and higher molecular weight fatty acid partial esters of aliphatic polyhydric alcohols, to produce a cream.

10. In a method of preparing creams, having especial utility for shampoos, the steps which comprise admixing with an aqueous solution of the sodium salt of a sulfate of the lauric acid amide of isopropanolamine, from about 6% to about 10% of sodium chloride and a sufficient amount, about 5%, of a member selected from the group consisting of normally solid soaps, higher molecular weight alcohols, and higher molecular weight fatty acid partial esters of aliphatic polyhydric alcohols, to produce a cream.

11. In a method of preparing creams, having especial utility for shampoos, the steps which comprise admixing from about 6% to about 10% of a member selected from the group consisting of alkali metal chlorides and disodium hydrogen phosphate with an aqueous solution of a water-soluble salt of a sulfate of a higher molecular weight fatty acid amide of a hydroxyalkyl primary amine in which there is at least one lower alkyl radical directly attached to the carbon atom to which the amine or hydroxyl radical is attached, the higher molecular weight fatty acid radical of said amide containing from 8 to 18 carbon atoms.

12. In a method of preparing creams, having especial utility for shampoos, the steps which comprise admixing with an aqueous solution of a water-soluble salt of a sulfate of a higher molecular weight fatty acid amide of a hydroxyalkyl primary amine in which there is at least one lower alkyl radical directly attached to the carbon atom to which the amine or hydroxyl radical is attached, the higher molecular weight fatty acid radical of said amide containing from 8 to 18 carbon atoms, a sufficient amount, at least about 5%, of a member selected from the group consisting of normally solid soaps, higher molecular weight alcohols, and higher molecular weight fatty acid partial esters of aliphatic polyhydric alcohols, to produce a cream.

13. In a method of preparing creams, having especial utility for shampoos, the steps which comprise admixing with an aqueous solution of a water-soluble salt of a sulfate of a higher molecular weight fatty acid amide of a hydroxyalkyl primary amine in which there is at least one lower alkyl radical directly attached to the carbon atom to which the amine or hydroxyl radical is attached, the higher molecular weight fatty acid radical of said amide containing from 8 to 18 carbon atoms, from about 6% to about 20% of an alkali metal chloride and an alkali metal sulfate.

14. In a method of preparing creams, having especial utility for shampoos, the steps which comprise admixing from about 6% to about 20% of sodium chloride and sodium sulfate with an aqueous solution of the sodium salt of the sulfate of the lauric acid amide of isopropanolamine.

15. In a method of preparing creams, having especial utility for shampoos, the steps which comprise admixing from about 6% to about 10% of sodium chloride with an aqueous solution of the sodium salt of the sulfate of the lauric acid amide of isopropanolamine.

16. An improved cream shampoo comprising a mixture of (1) a water-soluble salt of a higher molecular weight fatty acid amide of sulfated monoethanolamine, and (2), a water-soluble salt of a higher molecular weight fatty acid amide of a sulfated hydroxy-alkyl primary amine in which there is at least one lower alkyl radical directly attached to the carbon atom to which the amide nitrogen is attached, the higher molecular weight fatty acid radicals of said amides containing from 8 to 18 carbon atoms, (2) being present in proportions of about one to one of (1) to about three to one of (1).

17. An improved cream shampoo comprising a mixture of (1) the sodium salt of fatty acid amides of sulfated monoethanolamine and (2) sodium salts of fatty acid amides of sulfated hydroxy-alkyl primary amines in which there is at least one lower alkyl radical directly attached to the carbon atom to which the amide nitrogen is attached, the fatty acid radicals of said amides containing predominately from 12 to 14 carbon atoms, (2) being present in proportions of about one to one of (1) to three to one of (1).

HERBERT I. BERNSTEIN.
CHARLES F. FUCHS.

REFERENCES CITED

The following references are of record in the file of this patent:

UNITED STATES PATENTS

| Number | Name | Date |
|---|---|---|
| 1,946,272 | Brownlee | Feb. 6, 1934 |
| 2,181,087 | Caryl et al. | Nov. 21, 1939 |
| 2,203,642 | Kapp | June 4, 1940 |
| 2,216,617 | Katz | Oct. 1, 1940 |
| 2,237,629 | Orelup | Apr. 5, 1941 |
| 2,353,081 | Robinson et al. | July 4, 1944 |